United States Patent [19]
Zarlengo

[11] 3,894,808
[45] July 15, 1975

[54] MOUNT ADAPTER FOR CUTTING TOOLS AND METHOD OF OPERATING

[76] Inventor: Vincent Zarlengo, 3530 Chase St., Wheatridge, Colo. 81005

[22] Filed: Aug. 17, 1973

[21] Appl. No.: 389,171

Related U.S. Application Data

[63] Continuation-in-part of Ser. No. 169,672, Aug. 6, 1971, Pat. No. 3,753,385.

[52] U.S. Cl................................. 408/54; 90/31
[51] Int. Cl....................... B23b 41/00; B23d 5/00
[58] Field of Search.......... 90/11 C, 11 A, 11 R, 31, 90/38; 82/1.4, 19; 408/54; 29/23.5

[56] References Cited
UNITED STATES PATENTS
3,143,923  8/1964  Krzyszezuk............................ 90/31

*Primary Examiner*—Gil Weidenfeld
*Attorney, Agent, or Firm*—Wm. Griffith Edwards

[57] ABSTRACT

An adapter or tool mounting head for mounting cutting tools on milling machines, lathes, drill presses and the like comprises a body having an attaching extension for engagement by the chuck or other attaching device of the milling machine, a cutting tool attaching member movable axially with respect to the body and a control member arranged to be held stationary with respect to the milling machine. Cam members on the body and on the tool attaching member produce movement of the cutting tool such that it may move periodically or intermittently into and out of engagement with the work. The tool mounting head facilitates the use of a new method for utilizing a cutting tool for cutting slots to desired depths in a workpiece.

8 Claims, 26 Drawing Figures

MOUNT ADAPTER FOR CUTTING TOOLS AND METHOD OF OPERATING

This application is a continuation-in-part of copending application Ser. No. 169,672, filed Aug. 6, 1971 now U.S. Pat. No. 3,753,385.

This invention relates to tool holders, adapters or driving heads for securing cutting tools on milling machines, lathes, drill presses and the like and particularly to an improved method and an adapter or tool driving head for effecting periodic movement of the cutting tool into engagement with the work.

Machine tools, such as milling machines, lathes and drill presses have been designed to perform a wide variety of operations which may be programmed in a predetermined series of steps to provide the design configuration of a product to be produced thereby. Such machine tools in general are designed for use to manufacture products on a quantity production basis and are used to perform their specific operations over extended periods of time. These production machines require substantial time for resetting, servicing and programming to perform a different operation. The operators of machine shops desire to utilize their machine tools for as wide a range of functions as possible and it is desirable to simplify the setting up of a machine tool to perform specific operations while at the same time making it possible to change quickly the function of the machine to utilize it for other operations. It is desirable to provide simple and effective mechanisms to increase the range of operations which may be performed on a single machine tool, such as a milling machine, and which also facilitate the changing or different setting up of the machine for other operations with as little lost time as possible. It is also desirable to provide simple and effective methods and equipment for effecting intermittent cutting operations whereby slots or the like may be cut in a workpiece with minimum adjustment or manual control of the machine tool. Accordingly, it is an object of the present invention to provide a cutting tool adaptor for milling machines and the like for effecting repeated cutting operations quickly in a direct and simple manner.

It is another object of this invention to provide an adapter for cutting tools which facilitates the mounting of the tools on a machine tool such as a milling machine, lathe, drill press or the like and includes an improved arrangement for facilitating the movement of the tool intermittently into and out of engagement with the work.

It is another object of this invention to provide a cutting tool adapter for milling machines and the like which requires no change in the structure of the milling machine and which may be readily attached to the chuck or spindle of the machine to facilitate operation of the machine in producing a series of cuts at spaced intervals along the work by a single continuous operation.

It is a further object of this invention to provide an improved method for making a cut or slot in the face of a workpiece.

It is a still further object of this invention to provide a cutting tool control head for machine tools including an improved arrangement for effecting the cutting operation intermittently to provide a desired depth of cut in a workpiece.

Briefly in carrying out the objects of this invention in one embodiment thereof, a cutting tool mounting adapter or adapter assembly is provided which may be secured directly to the chuck or head of the milling machine, lathe or other equipment with which it is to be used. The adapter comprises a main body portion and a cutting tool mounting portion which may be moved axially with respect to the body portion; a control member is provided which may be held stationary, and when held stationary, effects axial movement of the cutting tool mounting member with respect to the body portion by engagement of cams provided for this purpose. When the tool is mounted eccentrically with respect to the axis of rotation of the adapter, the tool may be brought into engagement with the work periodically once during each revolution, by way of example, and a predetermined cut made in the work. By stepping or indexing the work forward during the period when the tool is out of engagement, a second cut spaced from the first cut may be made followed by the remaining steps required to complete the operation. It will be understood that the movement of the cutting tool to produce a plurality of cuts in order to provide the required depth of cut will be made using the conventional controls of the milling machine or other machine tool. In other embodiments of the invention, lateral or radial movement of the machine tool may be made by cam operation effected by interaction of the control member and tool holder of the adapter assembly and in a further embodiment the tool may be rotated on its own axis while it is rotated about the machine tool axis and is moved intermittently toward and away from the work.

In a still further embodiment of the invention, a tool control head is provided for cutting one or more slots in the face of a workpiece by utilizing intermittent cutting operations each in the same path while moving the tool out of engagement with the work between cuts.

The features of novelty which characterize this invention are pointed out with particularity in the claims annexed to and forming a part of this specification.

The invention itself, however, both as to its organization and manner of operation together with further objects and advantages thereof will best be understood by reference to the following description taken in connection with the accompanying drawings, in which:

Figure 1:
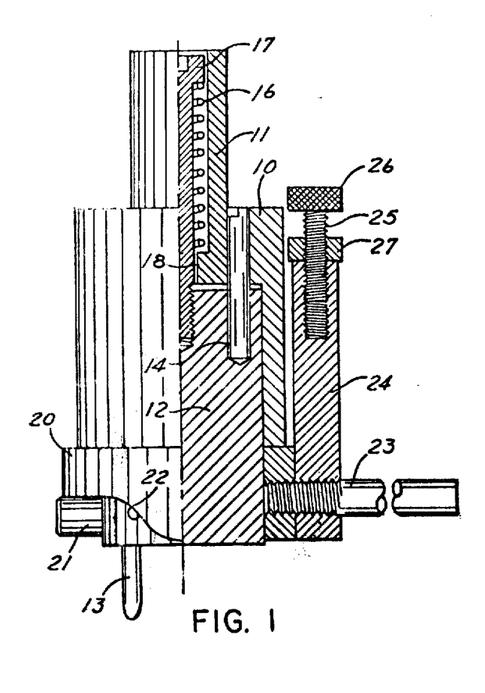
FIG. 1 is a side elevation view partly in section of a cutting tool adapter embodying the invention.
Figure 2:
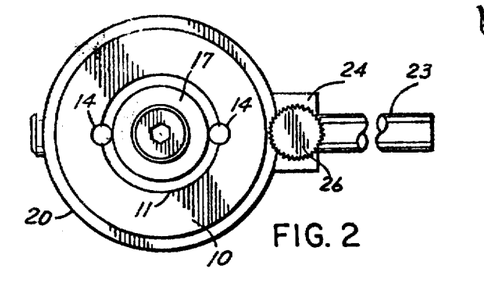
FIG. 2 is a top plan view of the adapter of FIG. 1.
Figure 3:
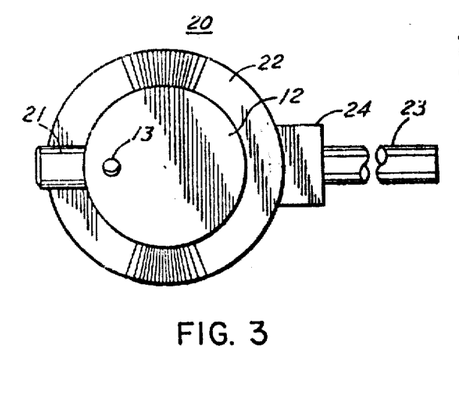
FIG. 3 is a bottom view of the adapter of FIG. 1.

Referring now to the drawings, the cutting tool mounting assembly illustrated in FIGS. 1, 2 and 3 comprises a generally cylindrical body portion 10 provided with an upwardly extending stub or connecting shaft 11 and carrying within the body 10 a cylindrical cutting tool holder 12 having a cutting tool 13 removably attached therein and extending axially downwardly from the holder 12 in a position spaced from the axis of rotation of the shaft 11. The shaft 11 has been illustrated as formed integrally with the body 10 and the tool holder 12 is axially movable within a complementary cylindrical passage in the body 10. The body 10 drives the holder 12 rotatably about the axis of the assembly through two pins 14 secured by a press fit to the holder 12 ahd extending for sliding movement in openings or passages in the body 10. The holder 12 is biased to its upward position by a compression spring 16 carried about a threaded bolt or guide 17 which is threaded into the holder 12 and retains the spring between an internal shoulder 18 on the body 10 and the head of the guide member 17.

In order to move the tool axially of the assembly a collar 20 is fitted about the lower portion of the body 10 and is freely rotatable with respect thereto. The collar is retained in position on the body 10 by a cam follower 21 which engages a cam surface 22 on the lower side of the collar 20. The collar 20 is restrained from movement by an arm 23 extending laterally from the collar and which is arranged to be engaged by a suitable stationary part of the milling machine or other machine tool with which the assembly is used. In addition, an upwardly extending bar 24 which extends parallel to the body 10 is secured to the collar 20 by the threaded arm 23 or in any other suitable manner and is provided with a suitable adjusting bolt including a threaded shaft 25 and a head 26, the head being adjustable into a position to engage a portion of the headstock adjacent the machine drive of the milling machine or other machine tool on which the assembly is mounted. A lock nut 27 is provided to hold the threaded member 25 in its desired adjusted position. The head 26 is preferably knurled to facilitate its use as a thumb screw for adjusting the position of the threaded member 25. The lock nut 27 may also be knurled for the same purpose.

Figure 4:
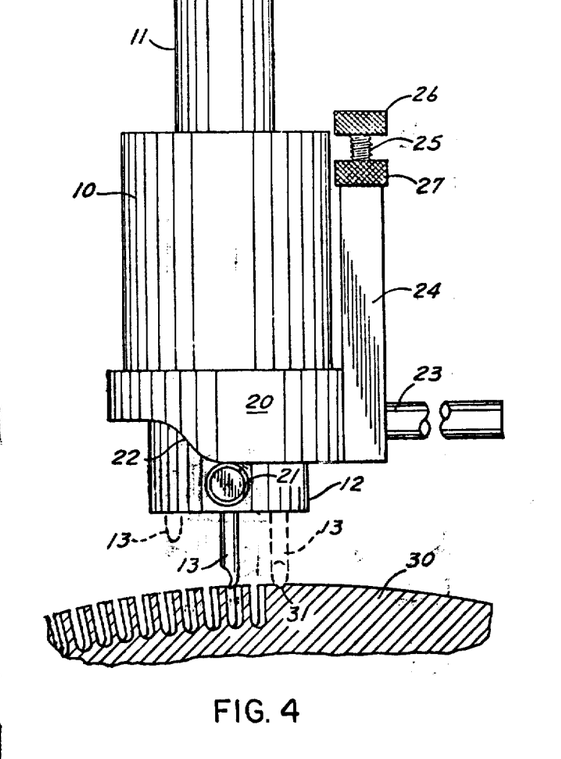
FIG. 4 is a side elevation view similar to FIG. 1 with the cutting tool turned through 270° from its position in FIG. 1 after making a cut in the work, a portion of which is shown below the adapter.
Figure 4A:
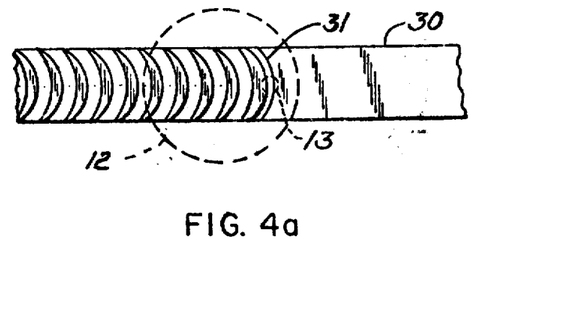
FIG. 4a is a top view of the work illustrated in FIG. 4.

During the operation of the cutting tool adapter when the control member 20 is held stationary and the shaft 11 is rotated by the chuck or other attaching device of the milling machine, the cam follower 21 moves from this position as shown in FIG. 1 rearwardly and downwardly over a curved surface of generally ogee configuration and which is a counterpart to the cam surface shown in FIG. 1 and when it has turned 180° is in a position indicated by dotted lines on the left hand portion of FIG. 4. To move into this position the tool makes a first cut in the work indicated at 30, the cut being indicated at 31. The tool continues around its circular path and when it is moved 270 degrees, is in a position shown in FIG. 4. Thereafter the follower 21 rides up the sloping surface of the cam and returns to its position shown in FIG. 1 after moving 360°. The work 30 as illustrated in FIG. 4 and in FIG. 4a has been shown as a portion of a circular metal disc of uniform thickness which is mounted with its center in alignment with the center of the tool in a position indicated by the left hand dotted lines of FIG. 4; the tool is thus positioned so that it will cut a generally radial slot in the edge surface of the disc 30. The slot which is cut by the tool as indicated in FIG. 4a is of circular configuration as formed by the movement of the tool over the arc of curvature produced by its rotation about the center axis of the shaft 11 and tool holder 12. The head of the milling machine is advanced continuously until the slot has been cut in successive increments upon each rotation of the tool and reaches the desired depth. After the cut has been completed the work 30 is indexed to rotate about its center to the position of the next cut. In FIG. 4a the position of the tool as indicated in FIG. 4 is shown in dotted lines as is also the circular outline of the tool holder 12. Cuts already made in the work 30 to full depth are illustrated to the left of the cutting tool position and it will be understood that the work is rotated counterclockwise as viewed in FIG. 4 during the indexing thereof. The product formed by providing the series of slots in the edge of the disc 30 is a turbine wheel having buckets of generally crescent shaped cross section, the circle cut by the inner edge of the tool 13 being smaller than that cut by the outer edge. It will be readily apparent that the entire machining of the turbine bucket is effected by operation of the cutting tool 13 and the control of the camming action of the adapter assembly. During the operation of the adapter assembly, the cutting tool 13 moves into cutting position periodically once during each revolution of the holder 12 and is withdrawn from the cutting position after it has made the cut in the work 30. It will be understood that the design of the cam surface 22 may be made to conform to the particular work operation which is required, and may be made to advance and retract the cutting tool in accordance with the work program. While the circular disc work has been illustrated it will be understood, by way of example, that flat work may be provided with slots in the same manner, the tool moving away from the plane of the top surface of the work before it passes over the work on the return to its position as shown in FIG. 1.

Figures 5, 8, 10:
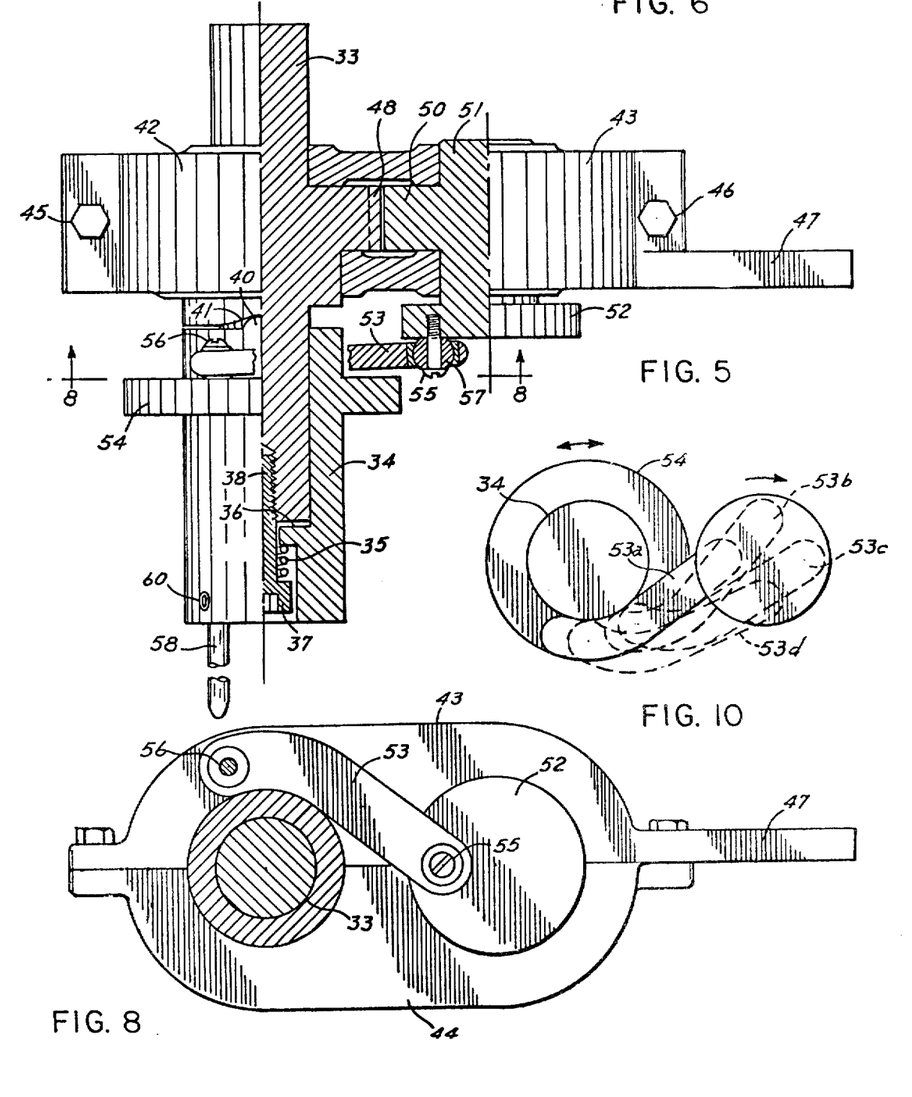
FIG. 5 is a side elevation partly in section of a cutting tool adapter assembly illustrating another embodiment of the invention.
FIG. 8 is a bottom view of the assembly of FIG. 5 along the line 8—8 of FIG. 5.
FIG. 10 is a diagrammatic top plan view of the reciprocating drive system of the assembly of FIG. 5.
Figure 6:
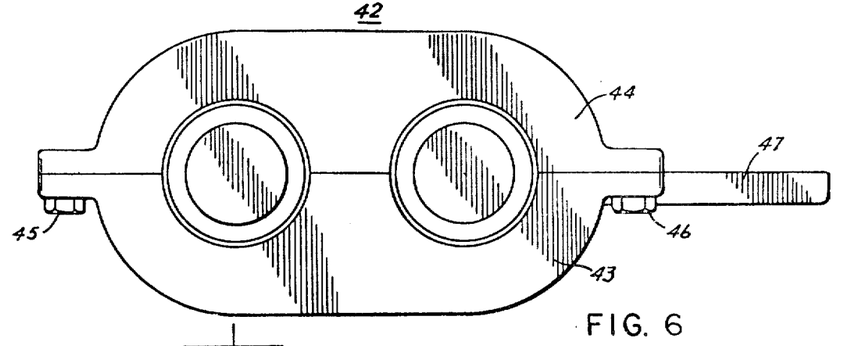
FIG. 6 is a top plan view of the assembly of FIG. 5.
Figure 7:
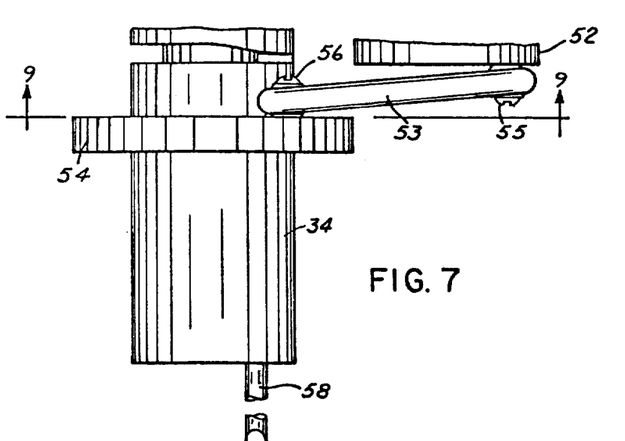
FIG. 7 is a partial sectional elevation of the assembly of FIG. 5 shown with the cutting tool moved downwardly and into its extreme right hand position.

In the embodiment of the invention illustrated in FIG. 5 the adapter is provided with a driving arrangement whereby a back and forth movement is imparted to the cutting tool, the camming action producing axial movement of the tool toward and away from the work over the arc of back and forth rotative movement of the tool holder. The adapter assembly of FIG. 5 comprises a shaft 33 having a cylindrical tool holder 34 rotatably mounted on the lower end thereof and movable axially against the pressure of the spring 35; the spring is retained in position between an internal shoulder 36 of the holder 34 and a head 37 of a threaded stud 38 secured in the center bottom end of the shaft 33. The shoulder 36 lies nearest the lower end of the shaft in the extended position of the spring 35 and upon rotation of the tool holder 34, the engagement of cam elements 40 at the top of the holder and 41 on the bottom of the enlarged portion of the shaft 33 moves the holder 34 downwardly against the force of the spring 35 thereby moving the tool toward the work. A gear case 42 as illustrated in FIGS. 5 and 6 constitutes a control member and comprises an elongated body or housing comprising a front half 43 and rear half 44 connected by machine screws 45 and 46. The half portion 43 of the housing is provided with an extension 47 which is arranged to be engaged by a stationary part of the milling machine or other machine tool to hold the control member stationary during the rotation of the shaft 33. The shaft 33 is formed to provide a gear 48 which meshes with a second gear 50 having a shaft 51 extending from both sides thereof and journalled in the housing 42. The rotatable disc 52 is formed at the lower end of the shaft 51 and a link 53 is provided to connect the disc 52 and a collar 54 formed on the cylindrical tool holder 34. The link 53 is pivotally connected to the disc 52 by a suitable screw or threaded member 55 and at the other end to the collar 54 by a similar screw 56. Both the screws 55 and 56 are provided with spherical seats within the respective ends of the link 53, the seat for the screw connection 55 being indicated at 57. FIG. 8 illustrates the position of the link 53 when the pin 56 is at its extreme left hand position and FIG. 9 when the pin is in its extreme right hand position.

Figure 9:
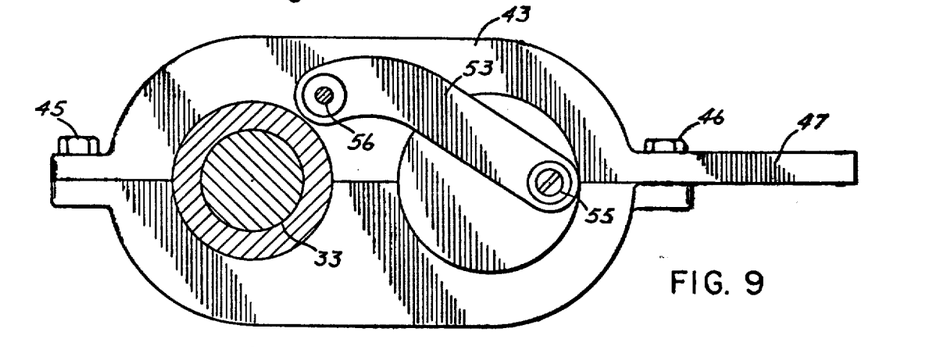
FIG. 9 is a bottom view of the assembly of FIG. 5 shown in the position of FIG. 7 and along the line 9—9 of FIG. 7.

The operation of the mechanical linkage mechanism is illustrated in FIG. 10 in which four positions of the link have been indicated. The first position, in full lines, and as viewed from below and shown in FIG. 8 is indicated at 53a, this being the position when the screw 55 is in the 9 o'clock position as viewed in FIG. 10. As the disc 52 rotates in a clockwise direction the link 53 reaches a position indicated at 53b which is in the 12 o'clock position. The disc then continues to rotate until it reaches the 3 o'clock position indicated at 53c which is the extreme right hand position of the link as illustrated in FIG. 9. On the continued rotation of disc 52 the link returns towards the position 53a and at 6 o'clock has reached the position indicated at 53d and then returns to the 9 o'clock position. It will thus be clear that the rotation of disc 52 produces a back and forth or reciprocating movement of the flange 54 and the tool holder 34 of which it is an integral part. During the movement of the tool along the circumferential path from the position of the screw 56 in the 53a position of FIG. 10 to its position at 53c and thence back to the 53a position, the tool has moved so that it may be positioned to move back and forth across the work. The cam surfaces 40 and 41 are arranged so that the tool is moved downwardly to its lowermost position and dwells there during a substantial portion of the forward stroke from the position 53a and is lifted from its lowermost position immediately after passing the position 53c. In the embodiment illustrated, the gears 48 and 50 are of the same size providing a 1 to 1 ratio and the upper cam surface 41 which is formed on the under side of the hub of the gear 48 is in position to depress the holder 34 and move the tool into engagement with the work only during a selected extent of the right hand portion of the movement of the link mechanism. The cutting tool, indicated at 58, is securely attached to the tool holder 34 by any suitable arrangement and has been illustrated in FIG. 5 as secured by a countersunk set screw 60, the tool 58 having a shank (not shown) extending within the tool holder 34 and a complementary passage in which the shank is engaged and clamped by the set screw 60.

As the tool moves with the tool holder 34 it performs its cutting stroke and returns through a relatively short arc to its initial position during which return it is retracted; thus it will be seen that this embodiment of the invention provides a relatively short stroke tool operation which employs a portion only of a complete revolution of the tool holder 34 to return the tool to its cutting position. The ball and socket joints provided at the screw connectors 55 and 56 afford pivotal and angular movement of the link to produce the reciprocating action of the flange 54 both in the retracted and advanced positions of the tool holder 34. These ball and socket joints are provided so that the screws 55 and 56 hold the spherical block 57 securely in position with respect to the disc 52 and flange 54 respectively. The universal or spherical movement of the link on these pivotal supports is effected by the engagement of the spherical seats in the ends of the link 53 with the outer spherical portion of the spherical members. The inner flat sides of the spherical members are seated securely against the flanges 52 and 54 and the links may pivot universally about the spherical members while their ends are retained by the screws 55 and 56.

Figure 11:
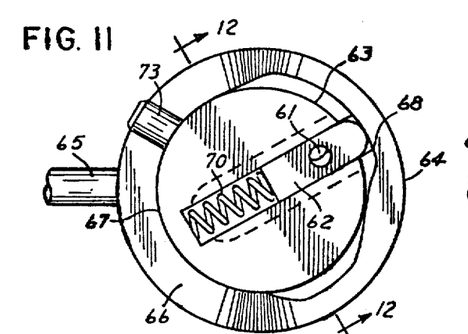
FIG. 11 is a partial view of an assembly similar to that of FIG. 1 illustrating an embodiment including a cam drive for moving the tool laterally of the drive axis.
Figure 12:
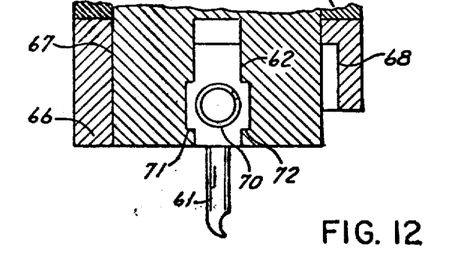
FIG. 12 is a sectional view along the line 12—12 of FIG. 11.

In FIGS. 11 and 12 there is illustrated an arrangement for effecting lateral or radial movement of the cutting tool as well as axial movement. By way of example, this device may be employed to cut fins as projections of rectangular cross section instead of the crescent shaped blades illustrated in FIG. 4a. The device of FIGS. 11 and 12 is designed for use on an adapter assembly as illustrated in FIG. 1. In the device of FIGS. 11 and 12 the tool, indicated at 61, is secured on a readily movable tool holding fitting 62 slidably mounted in the lower face of the rotatable tool holder indicated at 63. The control member indicated at 64 is provided with a stop arm or extension member 65 for engagement with a stationary part of the machine tool such as a milling machine to hold the member 64 against rotation. The member 64 is provided with a lower downwardly facing cam surface 66 corresponding to the surface 22 of FIG. 1 and is provided with an upwardly extending cam surface including a cylindrical portion 67 which is of the same diameter as the cylindrical tool holder 63 and with an outwardly extending cam portion 68. The slidable tool holder fitting 62 is biased outwardly from the axis of rotation by a compression spring 70 arranged in the slot in which it is mounted and which urges the slide against the cam surface. The fitting member 62 is of sufficient height to extend upwardly far enough to remain in engagement with the cam surface 67 or 68 regardless of the angular position of the fitting slide and of the position of the tool holder 63 with respect to the control member 64. The sectional elevation view of FIG. 12 illustrates the position in which the bottom faces of the body 63 and control member 64 are substantially flush, and shows the slide 62 and one turn of the spring 70, slide 62 being provided with lateral guide rails 71 and 72 which maintain the bottom of the slide flush with the bottom of the tool holder 63.

During the operation of the adapter 70 illustrated in FIGS. 11 and 12 a cam follower, indicated at 73, which engages the cam surface 66 and effects axial movement of the control member relative to the tool holder 63 in the same manner as the follower 21 and the cam surface 22 of FIG. 1. At the same time and over a length of the circumference of the tool holder 63 determined by the configuration of the cam surface 68 the slide 62 moves the tool outwardly and this movement may be employed to provide a desired cutting operation depending upon the configuration in which the work is being machined. For some applications it may be desirable to eliminate the axial movement by employing the lateral or radial movement of the tool effected by the slide 62 and for such applications the assembly is constructed without the sloping surfaces of the cam 66, the cam for this purpose being provided with a plane surface normal to the axis of rotation of the tool holder 63.

Figure 13:
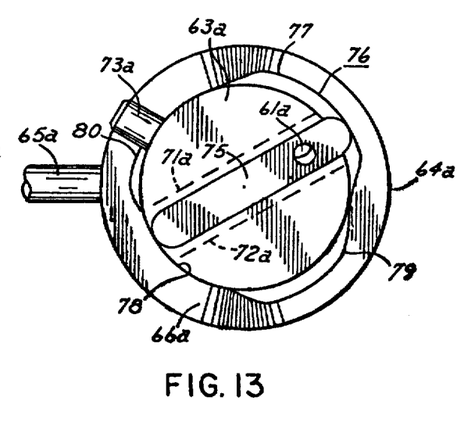
FIG. 13 is a view similar FIG. 11 FIG. illustrating another embodiment for effecting movement of the cutting tool.

For positive movement of the tool laterally of the axis of rotation of the adapter an assembly arrangement as illustrated in FIG. 13 may be employed. The construction of this arrangment is essentially similar to that of FIG. 11 except for the substitution of a positive positioning cam for the spring biasing of the lateral slide. The corresponding parts of this embodiment have been indicated by the same numerals as employed in FIGS. 11 and 12 with the addition of the suffix letter (a). In this embodiment of the invention a slide 75 is provided which extends diametrically across the tool holder 63a and carries the tool indicated at 61a securely held in the slide. This slide is provided with lateral rails for maintaining it in position in the holder 63a as indicated at 71a and 72a respectively.

The cam surface for the modification of FIG. 13 and as indicated at 76 is designed to maintain the slide 75 in contact with both surfaces 180 degrees apart throughout the 360 degrees of revolution of the tool holder 63a. By way of example, this cam has been shown as comprising two arcuate portions 77 and 78 and their complementary cam or guide portions 79 and 80 and each portion of the cam surface 76 is spaced from its 180° opposite portion by a distance equal to the length of the slide 75 with sufficient clearance to afford free rotation.

The operation of the embodiment of the invention illustrated in FIG. 13 is essentially the same as that of the embodiment of FIG. 12.

Figure 14:
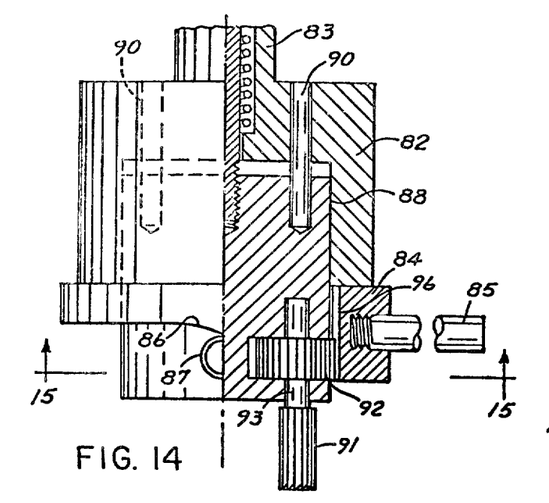
FIG. 14 is a side elevation view similar to FIG. 1 illustrating a further embodiment of the invention.
Figure 15:
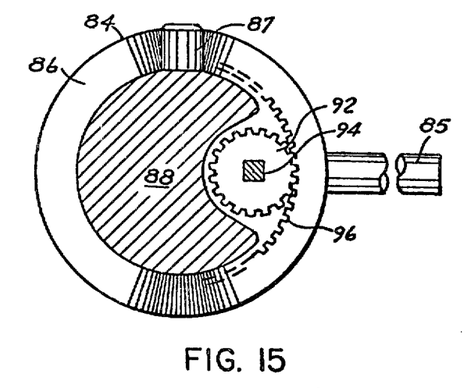
FIG. 15 is a sectional view from the bottom along the line 15—15 of FIG. 14.

The embodiment of the invention illustrated in FIGS. 14 and 15 is essentially similar to the embodiment of FIG. 1 but further includes the arrangement whereby the cutting tool is rotated on its own axis as well as about the axis of the tool holder. As illustrated the adapter assembly comprises a cylindrical body 82 having an upwardly extending stub shaft portion 83 for attachment to the chuck or other connecting device of the machine tool and a control member 84 having a stop member or arm 85 for engagement with a stationary portion of the machine tool. The control member 85 is provided with a downwardly facing cam surface 86 similar to the cam surface 22 of FIG. 1 and a cam follower 87 is mounted on the cylindrical tool holder, indicated at 88, and follows the cam surface 86 when the tool holder is rotated. The tool holder is axially movable with respect to body 82 and is restrained against rotational movement with respect thereto by two sliding pins 90 of essentially the same construction as the pins 14 of FIG. 1.

In order to rotate the cutting tool, indicated at 91, about its own axis as it moves around the axis of shaft 83, a planet gear 92 is mounted on the shaft of the tool 91 indicated at 93 and its rotation with respect to the shaft is prevented by a square portion 94 which fits within a complementary square central hole in the gear 92. The gear is locked to the shaft 94 by a set screw (not shown) and a cylindrical portion of the shaft 93 extends beyond the gear 92 as indicated at 95. The gear 92 extends beyond the side of the tool holder 88 into engagement with an internal gear 96 so that as the tool holder 88 rotates within the control member 86 the smaller gear 92 rotates on its own axis and as a planetary gear around the internal ring gear surface 86. The gears 92 and 96 slide axially with respect to one another during relative axial movement of the body 82 and tool holder 88.

During the operation of the adapter assembly of FIGS. 14 and 15 the tool 91 rotates on its own axis to cut the work with a milling action and is moved axially into engagement with the work and then retracted by cooperation of the cam surface 86 and the cam follower 87. This tool may be employed in a manner essentially the same as that of FIG. 1.

Figure 16:
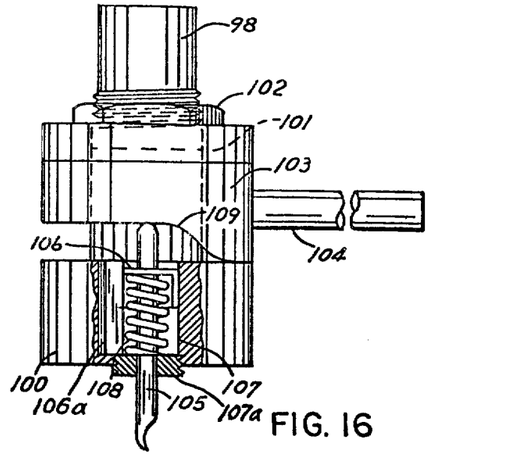
FIG. 16 is a side elevation view partly in section of another embodiment of the invention.
Figure 17:
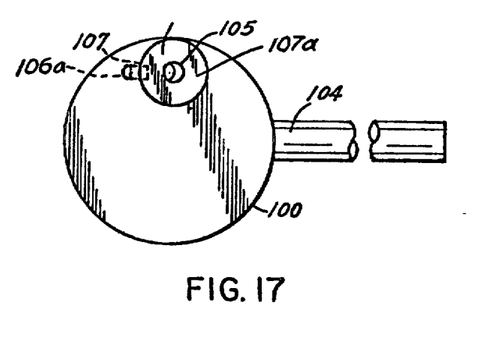
FIG. 17 is a bottom view of the assembly of FIG. 16.

A still further embodiment of the invention is illustrated in FIGS. 16 and 17. In this assembly a shaft 98 is provided for engagement with the chuck or other attaching device of the milling machine and is formed integrally with the lower cutting tool holding member 100. The shaft 98 is provided with a flange or collar 101 which is keyed to the shaft for rotation therewith but may be removed axially after the removal of a nut 102. The adapter is assembled by placing a control member 103 over shaft 98 into position against the tool holding portion 100 then placing the collar 101 in position against the top of the member 103 and threading the nut 102 over the assembly and adjusting it to its desired position. The member 103 is provided with an arm 104 for engaging the milling machine and preventing rotation of the member 103. FIG. 17 which is a bottom view of the assembly of FIG. 16 shows the position of the cutting tool indicated at 105 as eccentric with respect to the axis of the shaft 98 and in a portion of the member 100 outside the shaft 98. The tool 105 extends through an opening in a threaded plug 107a in the bottom of the holder 100 and is provided with a guide cup 106 rigidly attached to the tool and which is of the same diameter as a cylinder 107 through which the tool shaft passes. The cup 106 compresses and holds a compression spring 108 in position in the cylinder 107 and also acts as a guide for axial movement of the tool 105. The cup is held against rotation by a key 106a mounted in a slot in the member 100 and retained by a set screw or the like (not shown). The spring 108 presses the tool upwardly against a cam surface 109 and as the shaft 98 rotates with respect to the control member 103 the tool is alternately moved downwardly axially by the cam and moved back by operation of the spring 108. Thus the action of the tool 105 in this embodiment is essentially similar to that of the tool 13 in the embodiment of FIG. 1. This is a simplified configuration of the tool adapter assembly and may be found useful for various applications such as relatively light machining operations.

Figure 18:
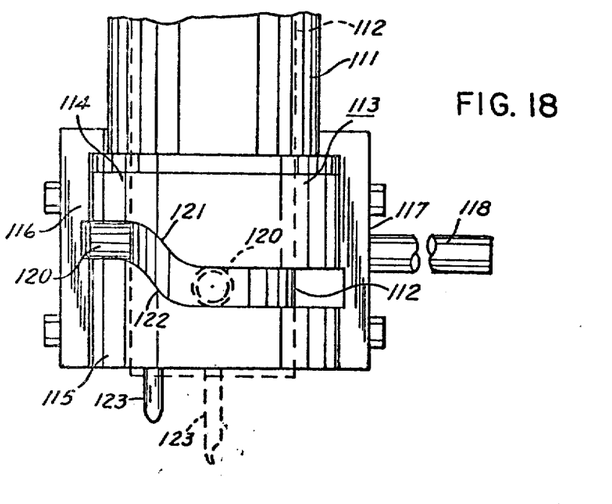
FIG. 18 is a partial side elevation view of a still further embodiment of the invention.

A positive advance and retraction of a cutting tool may be effected by the adapter arrangement illustrated in FIG. 18. In this embodiment the adapter assembly includes a body portion 111 within which a cylindrical tool holder 112 is mounted for axial movement. A control member 113 is provided which comprises an upper portion 114 and a lower portion 115 each of which slidably and axially engages the cylindrical holder 112. The portions 114 and 115 are secured together by tie bars 116 and 117 and a stop member or arm 118 is provided to hold the control member 113 against relative rotational movement with respect to the rotating members 111 and 112. In order to advance and retract the member 112 with respect to the member 113, a cam slot is provided which extends entirely around the control member 113 and a cam follower 120 secured to the cylinder 112 rotates in the cam slot. Cam slot is formed by complementary cam surfaces 121 in the member 114 and 122 in the member 115, and, as the cam follower 120 moves through the slot, it advances the cutting tool indicated at 123 from its full line position to a dotted line position, cylinder 112 shown in dotted lines below the control member 113. The movement of the cutting tool 123 is thus controlled by the camming surfaces in a manner essentially similar to that of the cylinder 12 in FIG. 1.

Adapter assemblies embodying the present invention may be employed on machine tools of the general type indicated regardless of the positioning of the rotational axis which may be vertical, horizontal or at some other angle, the operation of advancing and retracting the cutting tool being the same regardless of position and its use being effected in a manner depending upon the configuration of the work to be machined.

Applicant's invention provides an improved method for cutting slots or the like in a workpiece. The various devices disclosed herein facilitate the practice of this method. Applicant's invention is adapted for use in relatively temporary setups in machine shops and also may be equally useful in permanent equipment such as that employed on production lines.

There are described below devices particularly suited to the practice of applicant's invention in the manufacture of articles on production lines.

Figure 19:
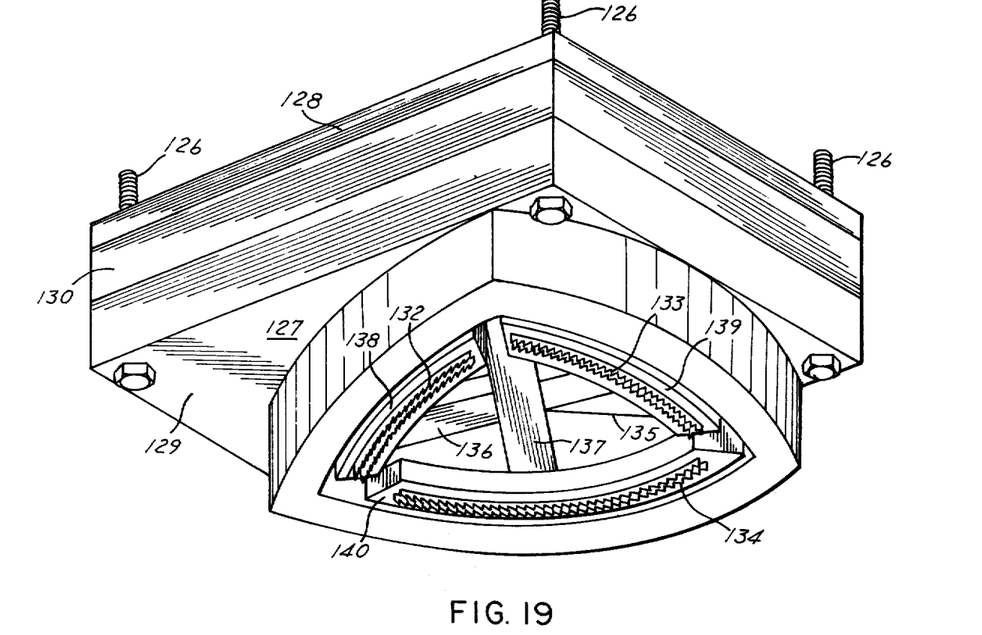
FIG. 19 is a lower side perspective view of a further embodiment of the invention.
Figure 20:
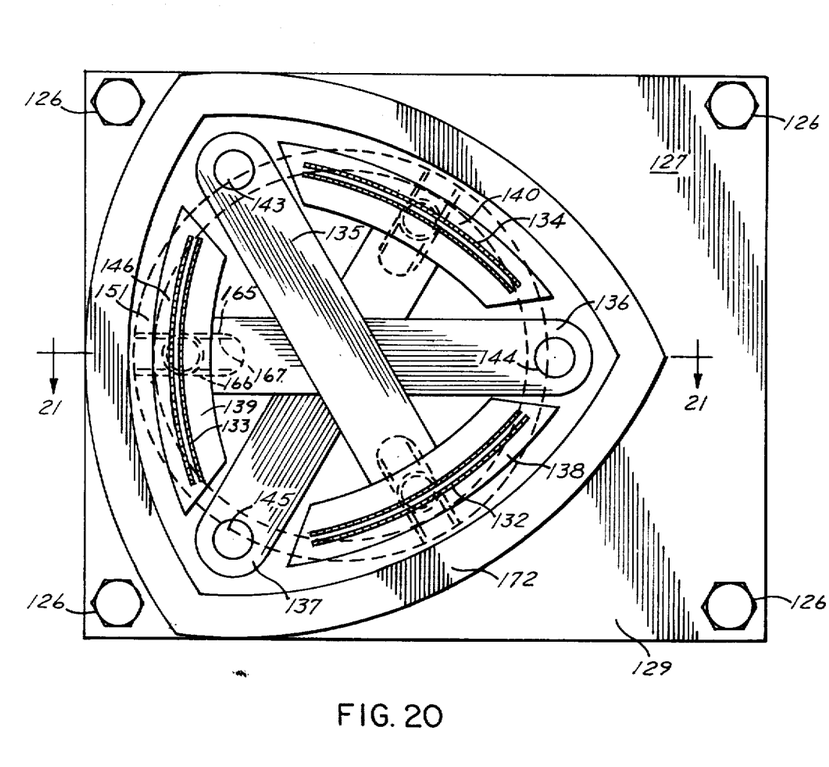
FIG. 20 is a bottom plan view of another embodiment of the invention.
Figure 21:
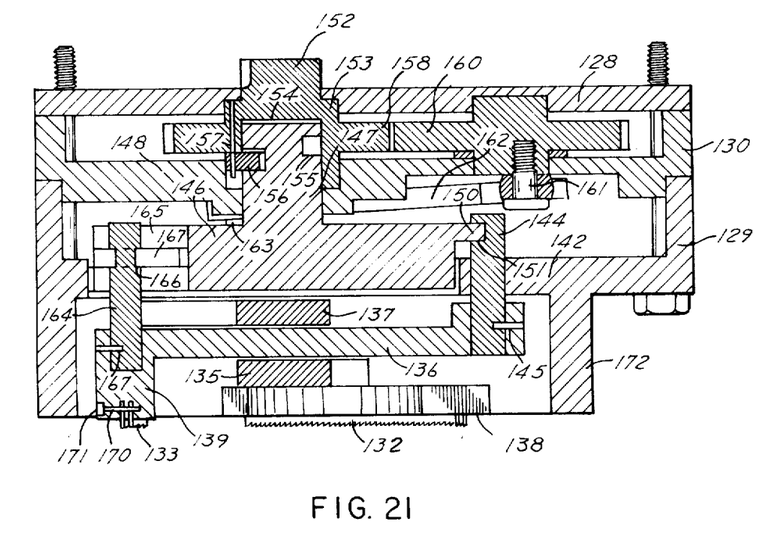
FIG. 21 is a sectional elevation view along line 21—21 of FIG. 20.

In the embodiment illustrated in FIGS. 19, 20 and 21, equipment is provided for the manufacture of articles such as the rotors of the rotary engine of the Wankel type which requires sealing slots in the rotors of the engine. FIG. 19 illustrates a unit intended by way of example for rigid mounting on the movable head member of a machine tool having a rotary drive shaft for actuating the cutting tools. The apparatus of FIG. 19 is a tool mounting head or assembly which may be attached to the head structure of the machine tool by bolts or machine screws, three of which are indicated at 126. This tool mounting head comprises a base 127 having top, bottom and intermediate sections 128, 129 and 130, respectively. These sections are bolted together and to the rigid structure of the machine tool and may be moved toward and away from a workpiece rigidly secured on a mounting table or other element in accordance with common practice. The head assembly 127 is arranged to bring three pairs of saw-like cutting tools 132, 133 and 134 into engagement with the workpiece and to move the cutting tools in a forward stroke and then retract the tool and return it for another forward stroke to increase the depth of the slot which is cut. The tools are mounted on rigid arms 135, 136 and 137, respectively. These arms are rigidly attached to the tool holders illustrated as arcuate members 138, 139 and 140. The saw-like cutting tools 132, 133 and 135 are securely attached in the arcuate members and each tool comprises a pair of the saw-like elements whereby a pair of slots can be cut in the workpiece by each tool. The mounting arrangement for the tools is shown more clearly in FIG. 20. As shown in FIGS. 20 and 21, the rigid arms 135, 136 and 137 which act as restraining or positioning bars are pivoted on an internal flange 142 formed in the housing member 129, pivot pins 143, 144 and 145, respectively, being provided for this purpose. Each of these pins, as exemplified by the pin 144 in FIG. 21, is pivotally and slidably mounted in the flange 142 and is rigidly secured to its respective one of the mounting bars by a key or pin 145, a rotor or drive disc 146 and a hub or stub shaft 147 at its center which is slidably journalled in a cross wall 148 of the housing member 130. The disc 146 has an outwardly extending flange 150 about its upper edge which engages slots in the pins 143, 144 and 145, as exemplified by the slot of the pin 144 indicated at 151. A stub shaft 152 is rotatably journalled in the wall member 128 and has a shoulder 153 which acts as a bearing against upward thrust of the shaft 152. Shaft 152 has a central cylindrical opening 154 which engages the shaft 147 and the disc 146 for both rotation and sliding movement. Shaft 147 is provided with a cam groove 155 and a cam follower 156 passing through an opening in the wall of the hollow portion of the shaft 152 engages the cam groove 155 and is securely held to the stub shaft 152 by a pin 157. The disc 146 is driven through gears 158 and 160 which are of one-to-one ratio, the gear 158 being formed on the stub shaft 152 and the gear 160 being rotatably mounted in bearings in the members 128 and 130 of the housing. The gear 160 is provided with an eccentric pin 161 on its lower side which engages a drive rod 162 pivotally connected to the disc 146 at 163. This drive arrangement effects oscillating or rotary reciprocating movement of the disc and is of essentially the same construction as the reciprocating drive illustrated in the embodiment of FIGS. 5 through 10. Thus, as the shaft 152 is rotated, the disc 146 is oscillated and rises and falls once during each oscillation due to the action of the cam surface 155 and follower 156. This axial movement of disc 146 moves the cutting tools 132, 133 and 134 toward and away from their working positions. The outer ends of the guide bars 135, 136 and 137 are provided with pins exemplified by the pin 164 of the arm 136 which is slidably mounted in a radial groove 165 in the disc 146, the pin having an annular groove 166 which engages shoulders 167 on the side walls of the slot 165. The lower end of the pin 164 is keyed or pinned to the outer end of the arm 136 by a pin or key 168. Thus, both ends of each of the arms 135, 136 and 137 are attached to the disc 146 for up and down movement therewith.

The arms 135, 136 and 137 as illustrated are of a configuration such that they may overlap at their central portions, the arms 135 and 137 being at the top and bottom and the arm 136 between them; if desired, the arms may be in running engagement to provide additional support at the cross-over area. The tool holders 138 and 139 and 140 are made of a depth such that they carry all of the cutting tools 132, 133 and 134 at the same level so that they lie in the same plane for engaging the workpiece.

The saw-like cutting tools 132, 133 and 134 are arranged in pairs and, as illustrated in FIG. 21, the cutting tools of the pair 133 are secured in the holder 139 in slots in which they fit closely and are pinned and keyed in their slots by a pin 170 which is a machine screw having a head 171 countersunk in the face of the tool holder 139. All of the blades are secured by pins in a similar manner, there being a plurality of pins for each blade to maintain the blades securely in position within their mounting slots. The blades are secured within the mounting slots with no looseness or lost motion and bear against the top walls of the slots as viewed in FIG. 21. As shown in FIG. 21, the tool holders and operating arms lie within a three sides walled flange 172 which is a quard wall for the moving parts of the tool mounting from which the cutting tools move axially outwardly into their positions for the cutting strokes.

In preparation for the operation of the slot cutting tool head illustrated in FIGS. 19, 20 and 21, the workpiece is securely mounted in position on the machine tool so that its face is in the plane parallel to the plane of the saw-like cutting tools 133, 134 and 135. The cutting head is then brought into position so that upon the outward stroke of the disc 146 the cutting tools will engage the surface of the workpiece and during the forward stroke will each make a cut in the surface. The reciprocating movement of the tool drive is continued until the cuts reach the required depth. During this operation of the tools, the tool head is advanced on the machine tool carriage at a continuous rate suitable for providing the required cut on each stroke. This cut may, for example, be of the order of 0.003 to 0.010 inch during each stroke of the cutting tool.

Figure 22:
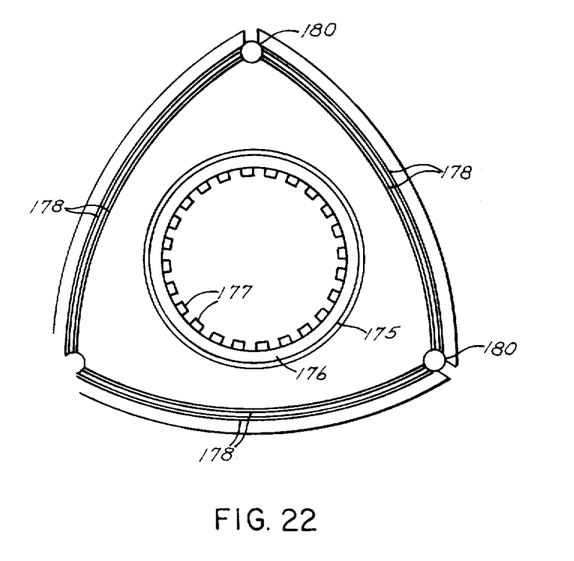
FIG. 22 is a top plan view of a workpiece cut by the tool of FIG. 19.

FIG. 22 illustrates a portion of a workpiece in which a cut has been effected by operation of the tool head of FIGS. 19, 20 and 21. The workpiece has a central opening 175 and a ring gear 176 fitted within the opening, it having externally extending gear teeth 177. Three sets of parallel slots 178 have been formed in the face of the workpiece between holes 180 spaced 120° apart about the central axis of the opening 175 and the slots 178 are equally spaced from the central axis of the opening. The workpiece illustrated is a rotor for a rotary engine of the Wankel type and the slots 178 are the side sealing slots thereof. During the operation of the tool head to form the slots 178 the cutting tools 132, 133 and 134 move a short distance determined by the reciprocating stroke of the machine. The tools are of a length equal to that of the slot to be cut less the length of the reciprocating stroke. The tool carrier bars 135, 136 and 137 hold the tools securely in position during their oscillating strokes and assure accuracy of the cutting of all of the slots simultaneously to the same depth. By applying the method of applicant's invention, arcuate slots may be cut in the faces of flat workpieces about axes spaced from the central axis of the drive. Thus the slots 178 cut in the workpiece illustrated in FIG. 22 have a radius of curvature substantially greater than the radius of curvature about the center axis of the hold 175, the axis for the slots 178 being a substantial distance on the far side of the central axis from the respective slots.

Figure 23:
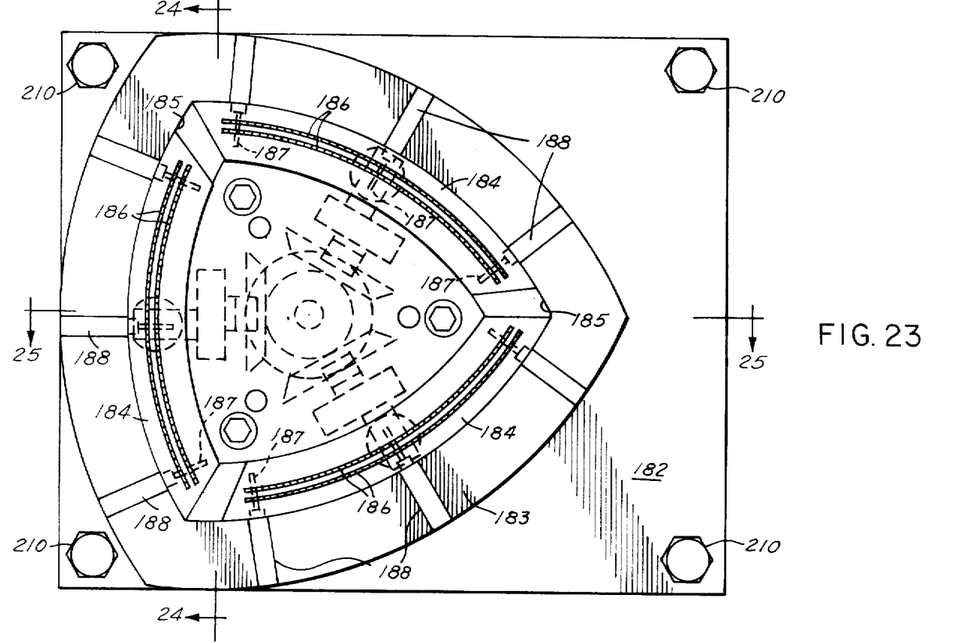
FIG. 23 is a bottom plan view of a still further embodiment of the invention.
Figure 24:
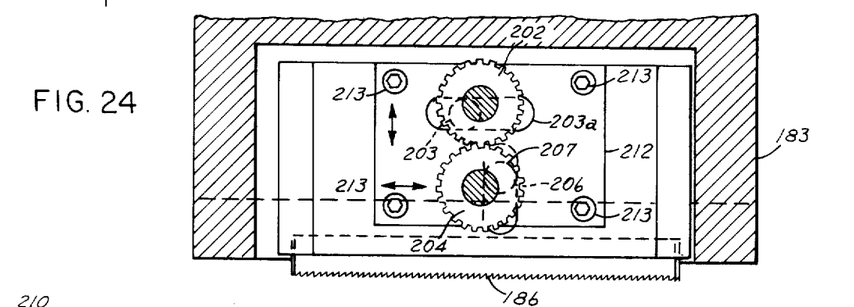
FIG. 24 is a side elevation partly in section of the device taken along the line 24—24 of FIG. 23; and, FIG. 25 is an enlarged sectional elevation view taken along the line 25—25 of FIG. 23.
Figure 25:
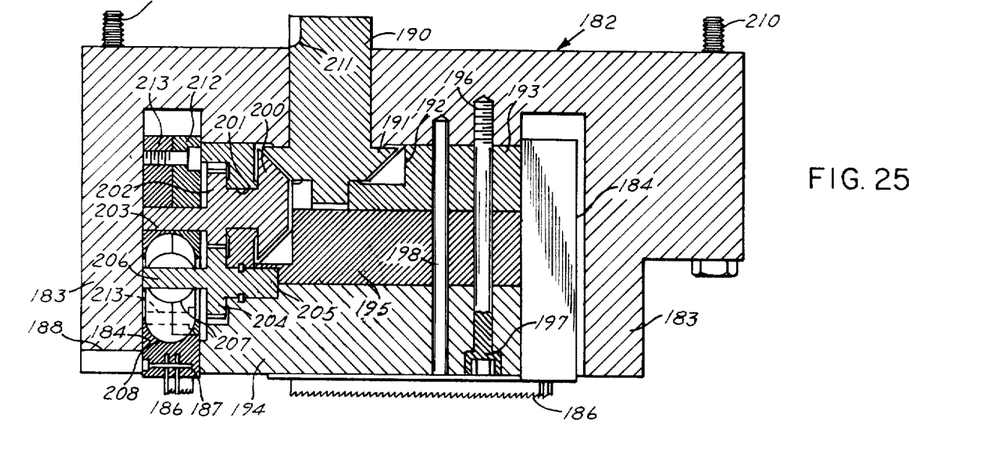

The embodiment of the invention illustrated in FIGS. 23, 24 and 25 is essentially similar to that illustrated in FIGS. 19 through 21, except that it employs a different driving arrangement for producing the rotary reciprocation or oscillating movement of the saw-like cutting tools. As illustrated in FIG. 23, a base or housing 182 is formed with an upstanding wall structure 183 comprising three arcuate walls of the same length; this construction is essentially similar to that illustrated in FIG. 20. The tool holding and driving mechanisms of this embodiment comprise three assemblies of the same construction and all parts of these have been designated by the same numerals. Three arcuate tool holders 184 are arranged to move in sliding engagement with arcuate surfaces 185 on the inner sides of the walls 183. The three tool holders have been illustrated in their extreme counterclockwise positions as viewed in FIG. 23. Each of the holders is provided with a pair of saw-like tools 186 mounted in slots in the same manner as the tools 132, 133 and 134 illustrated in FIG. 20. The tools 186 as illustrated are secured within their positions in the slots by pins 187 which are securely threaded in the holders 184 and have their heads counter sunk in the arcuate outer surfaces of the holders. Three of the pins 187 are employed for each of the holders 184 as illustrated and in the positions of the cutting tools shown in FIG. 23, the tool holding pins 187 are readily accessible through slots 188 provided in the bottom edge of the wall 183. Thus the blades may readily be replaced without disassembly of the tool mounting head. As shown in FIG. 25, a rotatable stub shaft 190 is journalled in the top wall of the base or housing 182 and carries a bevel gear 191 at its lower end. The gear 191 is located in a cylindrical recess 192 in a top portion 193 of the internal assembly within the base which includes a bottom portion 194 and an intermediate portion 195. The three portions or blocks 193, 194 and 195 are secured together by machine screws 196 which have countersunk heads 197 with Allen sockets. During the assembly of the tool head blocks, alignment or locating pins 198 are employed which are secured at their top ends in the inner top wall of the block or housing 182 and make it possible to assemble the interior blocks quickly.

The driving bevel gear 191 engages three driven bevel gears 200 arranged on axes normal to the axis of the shaft 190 and at 120° from one another. These gears are journalled in bearings 201 formed, for purposes of assembly, in two halves, one in each of the blocks 193 and 195. The bevel gears 200 drive gears 202 formed integrally therewith and which carry eccentric drive pins 203 each slidably engaging a recess 203a in its respective tool holder 184. The pin 203 is slidable along the recess 203a and is also axially slidable with respect to the tool holder. Rotation of the eccentric pin 203 moves the tool holder 194 up and down during rotation of the shaft 190. The disc carries a gear which meshes with a gear of the same size indicated at 204 and which is journalled in the box 194 and 195 on a stub shaft 205. The gear 204 carries an eccentric pin 206 on which is mounted for both sliding and rotating movement a ball 207 movable in a vertical slot 208 formed in tool holder 184. Rotation of the gear 204 produces horizontal reciprocating movement of the block 184.

When the base 182 is mounted in position on the moving carriage of the machine tool, bolts 210 are tightened to hold the tool head securely and rigidly in position. In this position the stub shaft 190 is engaged by the rotatable drive shaft of the machine tool, it being held against rotation with respect to the drive shaft by a suitable key in the usual manner; a keyway for such key is indicated at 211 in FIG. 25. During the operation of the tool drive when the stub shaft 190 is rotated, the three tool holders 184 move back and forth along their arcuate surfaces and also move up and down axially of the arcuate surfaces to move the tools 186 toward and away from the workpiece and during engagement with the workpiece the holder is moved forward along the arcuate path to produce a cut in the bottom of the slot in the workpiece.

The housing 182 and the blocks and tool holders which are fitted within the housing are arranged so that they may be easily assembled and held in place by the bolts 196. As pointed out above, the gears 191 and 200 are positioned in running engagement within recesses formed in the blocks 193 and 195. When these blocks are separated the gears 200 are released from the bearing surfaces 201 and may be removed by sliding the stub shafts 203 out of their position within the slides 203a. In order to mount the balls or spherical guide members 207 within the recesses 208 in the blocks 184, the blocks are formed with a detachable plate portion 212 which is made arcuate to conform to the inner surface of the holder 184. The plate 212 is held in position by a plurality of machine screws 213. The arcuate passages for the blocks 184 extend somewhat beyond the lowermost portion of the top wall of the housing 182 as indicated in FIG. 25.

During the operation of the embodiment of the invention illustrated in FIGS. 23, 24 and 25, the cutting stroke is quite short because the longitudinal movement of the saw-like cutting tool is brief, the extreme lower position of the tools being that when the drive pin 206 is in its lowermost position with its axis directly below the axis of the gear shaft 205.

While the invention has been described in connection with specific embodiments thereof, various modifications and other applications will occur to those skilled in the art. Therefore, it is not desired that the invention be limited to the details illustrated and described and it is intended by the appended claims to cover all modifications which fall within the spirit and scope of the invention.

I claim:

1. In a machine tool including a stationary base having mounted thereon a rotary drive shaft, a tool mounting head and a cutting tool thereon, and means for holding a workpiece in position for engagement by the cutting tool, the method of producing a slot in a workpiece which comprises the steps of:
   a. securing a workpiece in position on the holding means;
   b. producing reciprocating arcuate movement of said tool and said workpiece holder with respect to one another in opposite directions in forward and return strokes transversely of the workpiece;
   c. moving the tool and the holding means relatively toward one another to bring the tool into cutting engagement with the workpiece;
   d. utilizing the forward stroke of said reciprocating movement for driving the tool and the holding means relatively with respect to one another along the path of the cut to be made to produce a cut in the workpiece;
   e. moving the tool and the workpiece relatively away from one another and utilizing the return stroke of said reciprocating movement for returning them to their initial position; and,
   f. repeating said steps of moving relatively toward and driving and moving relatively away and returning to produce repeated cuts along the same path until the cut in the workpiece attains a predetermined depth.

2. The method of producing a slot in a workpiece as set forth in claim 1 including the step of moving the tool mounting head and the holding means toward one another at a predetermined feed rate.

3. The method of producing a slot in a workpiece as set forth in claim 1 wherein said workpiece is held stationary with respect to the base of the machine tool and said reciprocating movement and said movement of the tool and the workpiece toward and away from one another are effected by movement of said tool with respect to the stationary base.

4. The method of producing a slot in a workpiece as set forth in claim 1 including the step of providing a cutting tool of a saw-like configuration having cutting teeth with their tips terminating in the same plane and shaped to conform laterally to a predetermined configuration to produce a slot of a desired shape and moving the tool along the slot during the cutting thereof.

5. The method of producing a slot in a workpiece as set forth in claim 4 including the steps of providing the saw-like tool with an arcuate configuration for producing an arcuate slot in the workpiece.

6. The method of producing a slot in a workpiece as set forth in claim 4 wherein the saw-like tool is selected to be of less length than the slot to be produced and including the step of controlling the forward and return strokes to be of lengths of the order of the difference between the lengths of the slot to be formed and of the saw-like tool.

7. In a machine tool including a stationary base having mounted thereon a tool mounting head and means for holding a workpiece in position for engagement by a cutting tool mounted in the head, the method of producing arcuate slots in a workpiece which comprises the steps of:
   a. securing a workpiece in position on the holding means;
   b. providing a plurality of cutting tools mounted on the head in spaced positions about a central axis;
   c. simultaneously moving the plurality of cutting tools toward the workpiece and then forwardly in cutting engagement therewith along respective arcs about axes each spaced from said central axis;
   d. withdrawing the tools upon termination of the cuts and returning them in reverse direction to their initial positions; and,
   e. repeating said steps of simultaneously moving the tools toward the workpiece and forwardly along the arcuate cut and away from the workpiece and return in reverse direction to produce repeated cuts along the same arcuate paths until the cuts attain a predetermined depth.

8. The method of producing a plurality of arcuate slots in a workpiece as set forth in claim 7 wherein three cutting tools are mounted in the mounting head about the central axis at the same distance therefrom and on axes 120° apart and wherein the reciprocating strokes of said tools are made about respective axes on the far side of said central axis from each respective tool.

* * * * *